United States Patent [19]

Mixon et al.

[11] 3,893,957
[45] July 8, 1975

[54] FOAMED AND ORIENTED BLENDS OF LOW DENSITY POLYETHYLENE AND POLYPROPYLENE

[75] Inventors: Donald E. Mixon; Dan F. Stewart, both of Bartlesville, Okla.

[73] Assignee: Phillips Petroleum Company, Bartlesville, Okla.

[22] Filed: Aug. 14, 1968

[21] Appl. No.: 752,502

[52] U.S. Cl. ...... 260/2.5 HA; 260/2.5 E; 260/42.21; 260/42.46; 260/897 A
[51] Int. Cl. ............................................. C08f 47/10
[58] Field of Search ........ 260/2.5 E, 2.5 HA, 897 A

[56] References Cited
UNITED STATES PATENTS

| | | | |
|---|---|---|---|
| 3,215,486 | 11/1965 | Hada et al. | 260/2.5 E |
| 3,227,784 | 1/1966 | Blades et al. | 260/2.5 E |
| 3,231,524 | 1/1966 | Simpson | 260/2.5 E |
| 3,240,727 | 3/1966 | Scalari et al. | 260/2.5 |
| 3,372,049 | 3/1968 | Schaffhausen | 260/898 |
| 3,408,322 | 10/1968 | Mills | 260/2.5 |
| 3,411,967 | 11/1968 | Rowland et al. | 260/2.5 |
| 3,480,507 | 11/1969 | Gouw et al. | 260/2.5 E |
| 3,542,909 | 11/1970 | Breukink et al. | 260/2.5 E |

*Primary Examiner*—Morton Foelak

[57] ABSTRACT

A blend is made of a low density polyethylene and polypropylene. The blend is foamed with a blowing agent. A colorant can be incorporated into the polyethylene and/or into the polypropylene whereupon the two polymers are then blended and foamed, as by extruding with a foaming or expanding agent in the final blend. Sheets, films, rods, ribbons, filaments tows, and other shapes can be extruded. The extrudate is oriented to yield a product having increased opacity and improved sheen.

11 Claims, No Drawings

FOAMED AND ORIENTED BLENDS OF LOW DENSITY POLYETHYLENE AND POLYPROPYLENE

This invention relates to blends of low density polyethylene and polypropylene which have been foamed and oriented. In one of its aspects the invention relates to the production of variously shaped, foamed and oriented blends of a low density polyethylene and a polypropylene. In another of its aspects, the invention relates to blends of a low density polyethylene and a polypropylene which have been foamed and oriented. In a further aspect of the invention, it relates to the production of sheets, films, rods, ribbons, filaments, tows, and other shapes having increased opacity and improved sheen. In a more specific aspect the invention relates to such products which have been colored, as by addition of a colorant such as a dye or pigment.

In one of its concepts the invention provides a method for obtaining the better dispersion of pigments into a plastic mass having the properties of polypropylene by incorporating into the polypropylene a low density polyethylene and adding the pigment to at least one of said polymers and then when said polymers and pigment have been blended, foaming and orienting the blend, thereby improving uniformity of cell size, gloss of product, opacity of the product and other properties such as sheen and even flexibility. In another of its concepts the invention provides a method of producing a color concentrate of a low density polyethylene, blending said color concentrate in polypropylene in a foaming recipe as with azobisformamide and then producing a foamed, decorative sheet, ribbon or other shape as herein described, employing in the preferred form of the invention for its purposes approximately 5 to approximately 20 weight percent of the low density polyethylene. Thus in one of its concepts the invention provides in its now preferred form a foamed and oriented extrudate composed of a low density polyethylene and crystalline polypropylene, there being present a minor proportion of a low density polyethylene and a sufficient major proportion of polypropylene to prepare a blend. In another of its concepts the invention provides a method for producing such a product by first preparing a polypropylene color concentrate containing say 0.1 – 30 percent pigment and blending such a color concentrate with a low density polyethylene which need not contain color and thereafter further blending a blend thus obtained with polypropylene to obtain a final blend which is then foamed and oriented to obtain a product having the properties herein set out.

We have now found that the incorporation of a low density polyethylene into a polypropylene, which is to be foamed and oriented to produce say a ribbon or other product as herein described, gives a finished product having greater opacity and improved sheen which is accomplished during orientation as by stretching, preferably longitudinally, and that this appears to be due to the presence of polyethylene on the surface of the foamed product or sheet. Blends according to our findings can have incorporated therein one or more of a wide variety of color imparting agents or materials. Sheets or ribbons produced from such blends are particularly attractive and useful for packaging purposes, for example, packaging soap, such as hand soap.

An object of this invention is to produce blends of polyethylene and polypropylene having improved properties upon extrusion and orientation. Another object of the invention is to produce a blend of polymers having improved gloss or sheen, more uniform cell size, improved opacity and flexibility. A further object of the invention is to produce a colored polypropylene product having a more uniformly dispersed colorant or pigment or dye therein.

Other aspects, concepts and objects of the invention are apparent from a study of this disclosure and the appended claims.

According to the present invention a low density polyethylene and polypropylene are blended, foamed and oriented.

Still according to the invention there is incorporated into at least one of the polymers a colorant or pigment prior to the blending of the polymers. Further according to the invention a foaming or expanding agent can be added at any stage of the operation. In one form of the invention the blowing or expanding agent is added to a pelletized master batch or blend of a low density polyethylene, a colorant and polypropylene.

The following are examples supplied by way of additional disclosure. One skilled in the art can accomplish variation and modification of these examples without departing from the basic concepts of the invention which are apparent from a study of this disclosure.

EXAMPLE I

Low density polyethylene density (D) 0.915, Melt Index 12, is blended in an extruder or Banbury with 3 percent by weight of a pigment, e.g., phthalocyanine blue, phthalocyanine green, etc., and pelletized. Approximately 10 pounds of this blend or concentrate are tumbler blended with approximately 90 pounds polypropylene pellets, D – 0.905, melt flow 3–5, and 0.1 – 1.5 percent preferably 0.2 – 0.4 percent of a blowing agent, azobisformamide at a level of about 0.35 parts per hundred now being a preferred agent. The final blend thus obtained is extruded in the form of a film which is then oriented by stretching to obtain good color distribution, better sheen and increased opacity.

EXAMPLE II

Ten pounds of a polypropylene colored concentrate containing 4.80 weight percent yellow toner (CIBA Chromopthal gr), 0.308 weight percent red pigment (Harshaw 1059), 0.264 weight percent phthalocyanine green (Harshaw 3826), 15 pounds of uncolored, low density polyethylene and sufficient uncolored polypropylene to make up 100 pounds of final blend are blended in a rotary drum blender together with 0.1 to 1.5 percent by weight of a blowing agent based on total resin weight. Final blend is then extruded into a foamed ribbon which is then oriented to produce a decorative ribbon of improved feel and sheen.

EXAMPLE III

A blend of Example I or II, but without foaming agent is first pelletized to form a master batch. A blowing agent is added to the pelletized master batch and then passed through an extruder to form a foamed sheet which is oriented and sized to produce a decorative ribbon. The foamed, oriented sheet may be used as a fancy wrapper.

EXAMPLE IV

Ten pounds of a low density polyethylene foam concentrate, i.e., a minor proportion, was blended with sufficient colored polypropylene to make 100 pounds of blend. This material was extruded and oriented as in Example I and formed into decorative ribbon.

The foam concentrate was a polyethylene having a density of 0.915 and contained 3 weight percent azobisformamide as blowing agent. The polypropylene was as used in Example I except that it contained 0.5 weight percent Harshaw 1058 pink pigment.

EXAMPLE V

A foam concentrate is prepared by blending 3 parts by weight of azobisformamide into 97 parts of polyethylene. Ten parts of this blend is then admixed with 90 parts of polypropylene. This final blend thus obtained, with or without colorant, is suitable for plastification as in an extruder following which it is extruded and oriented.

EXAMPLE VI

The following are additional examples, given summary-wise, of mixtures or blends which can be prepared according to the invention.

A. Low density polyethylene concentrate containing both a blowing agent and a colorant is blended with polypropylene as in Example IV.

B. A blend as described in Examples I–VIA is extruded into a foamed film which is slit into ribboms of suitable widths and then drawn and oriented to give the decorative ribbon product of this invention.

The low density polyethylenes which can be used according to this invention are various as will be understood by one skilled in the art having studied this description. It is now well known in the art just what is meant by "low density polyethylene," as distinguished from "high density polyethylene." The processes for making both low and high density polyethylenes are well known and need not be described here. A low density polyethylene for the purposes of this disclosure will usually have a density in the range of from about 0.914 to about 0.925.

The polypropylene which is used according to this invention is a crystalline polypropylene which can be prepared according to the process disclosed and claimed in U.S. Pat. No. 2,825,721, issued Mar. 4, 1958, John P. Hogan and Robert L. Banks. Other functionally equivalent polypropylene can be used. Usually the polypropylenes will have a density of about 0.9.

While certain ranges or proportions of low density polyethylene to crystalline polypropylene have been set forth, it is possible to operate outside these ranges. Thus while a range of from about 5 to about 20 weight percent of polyethylene is blended with the crystalline polypropylene, disregarding colorants or other conventional additives such as antioxidants, etc., it is possible to use somewhat less or even more than a proportion within the range set out. One skilled in the art can determine by mere routine test for his purposes just what the proportion he may wish to use shall be. The broad concept of the invention lies in making of the blend. The proportions are a more specific concept of this invention.

U.S. Pat. No. 3,214,234, issued Oct. 26, 1965, Anthony Bottomley describes and claims oriented foam polyolefin extrudates and the production and dyeing of the same.

U.S. Pat. No. 3,342,913, issued Sept. 19, 1967, Thomas Paul Engel describes and claims process and apparatus for the production of moldings or extrusions having a cellular structure from thermoplastic synthetic materials.

The composition or blend of the present invention will ordinarily contain a minor proportion of the low density polyethylene. As noted in the examples, the blends can be variously obtained, as one skilled in the art will understand. Suffice to say, the final blend, which is foamed and latter oriented, will contain the low density polyethylene, the polypropylene and as the case may be, the colorant or pigment or dye and any other additives which are to be incorporated. Various additives are contemplated for various purposes. Preservatives, ultraviolet light absorption or antioxidant materials can be incorporated. Fillers to give various effects pleasing to the eye can also be used in addition to the colorants.

As will be understood by one skilled in the art when the blend is being extruded, it will, of course, be molten since it is being shaped passing through the die.

The orienting or drawing, as the case may be, of the foamed product can be accomplished by heating the formed foamed product in the usual manner and then drawing the same. The drawing will ordinarily be a longitudinal one. However, multi-directional orienting is within the scope of the invention and claims thereto. A small amount of orienting can be caused to occur during the foaming, as when the molten mass is setting and is sufficiently crystalline to be oriented by the internal gas pressure caused by the expanding or foaming agent. Now preferred as noted elsewhere herein is a longitudinal stretching. Transverse or other orienting can also be employed.

The techniques of the prior art and especially of the patents referred to herein are applicable to the present invention.

Blowing agents, in addition to that earlier mentioned, are:

Sodium carbonate, sodium bicarbonate, ammonium carbonate, azobisisobutyronitrile, diazoaminibenzene, benzene - sulfonyl - hydroxide.

Colorants or pigments or dyes which have been used to obtain products according to this invention have the improved properties set out earlier herein are:

Phthalocyanine blue, phthalocyanine green, carbon black, fluorescent pigments, quinacridone pigments, carbizole diazine dyes, among others.

It will be understood that the products of the invention have an improved sheen as well as an improved fee. Where colorant is used, color intensity appears to be greater generally, and for a given kind and proportion of colorant, for a very pleasing effect.

The amount of the colorant and of the blowing or expanding agent will vary according to the particular result intended. When ruptured cells are principally desired more agent can be used together with an appropriate set of conditions as one skilled in this art having studied this disclosure will comprehend.

Organic dyes or colorants are now preferred over inorganic dyes.

The disclosures of the patents to which reference is made herein are incorporated by reference.

As an important feature of the invention, concentrates termed "foam concentrates" are prepared to contain essentially a low density polyethylene and a blowing agent in an amount effective upon heating a blend of said concentrate and crystalline polypropylene to foam said blend, the proportion of the polyethylene to polypropylene in the final mix being in the approximate range 5 – 20 to 95 – 80.

Reasonable variation and modification are possible within the scope of the foregoing disclosure and the claims to the invention the essence of which is that a blend, of a low density polyethylene and of a crystalline polypropylene, which can contain colorant or pigment, is extruded foamed and oriented to obtain a product having properties as herein described.

We claim:

1. A foamed and oriented extrudate, the orientation of which has been effected by longitudinally stretching the same, composed essentially of approximately 5 to 20 weight percent of the composition of a low density polyethylene having a density in the approximate range of 0.914–0.925 and crystalline polypropylene said low density polyethylene being present in an amount such that the foamed and oriented extrudate will have increased opacity and improved sheen, flexibility and feel and when dye is contained therein a greater color intensity.

2. An extrudate which has been foamed and oriented and which contains colorant, the extrudate being according to claim 1, the colorant having been added to one of said polyethylene and polypropylene and said polyethylene and said polypropylene then having been blended together.

3. A foamed substantially longitudinally oriented and elongated extrudate of a blend of a low density polyethylene and a polypropylene, said extrudate being foamed throughout its entire mass and said foamed characteristic having been imparted to the blend while the blend is molten and while it is being extruded and the blend having been longitudinally elongated and oriented after it has been foamed, said extrudate being according to claim 1.

4. An extrudate according to claim 3, said extrudate containing a colorant, the colorant having been blended into said polyethylene or polypropylene and then said polyethylene and said polypropylene having been blended together.

5. A method for preparing an extrudate according to claim 1 which comprises blending together approximately 5 to about 20 weight percent of the composition of a low density polyethylene having a density in the approximate range of 0.914–0.925 and a crystalline polypropylene, incorporating a blowing agent into the blend, extruding the blend and foaming the same during extrusion and then orienting the product thus obtained by longitudinally stretching the same, said low density polyethylene being present in an amount such that the foamed and oriented product thus obtained will have increased opacity and improved sheen, flexibility and feel and when dye is contained therein a greater color intensity.

6. A method according to claim 5 which comprises incorporating a colorant into the blend before it is foamed, the colorant having been incorporated into said polyethylene or polypropylene and then said polyethylene and polypropylene having been blended together.

7. A method of preparing an extrudate according to claim 5 which comprises blending approximately 5–20 percent of a low density polyethylene and polypropylene and an expanding agent, the percent polyethylene being based on the weight of the polypropylene, extruding and foaming during extrusion the blend thus obtained and then orienting the foamed blend.

8. A method according to claim 7 wherein a colorant is added to at least one of said polyethylene and polypropylene and then said polyethylene and polypropylene are blended together and then the product is extruded in the form of a sheet or ribbon which is then oriented.

9. A method according to claim 7 wherein a colorant is added to at least one of said polyethylene and polypropylene and then said polyethylene and polypropylene are blended together and then the product is extruded in the form of a filament, rod or tow which is then oriented.

10. A method for producing a product according to claim 1 which is foamed and substantially oriented which comprises forming a molten mixture of a low density polyethylene having a density in the approximate range of 0.914–0.925 and crystalline polypropylene, the proportion of the polyethylene relative to the polypropylene in the mixture being in the approximate range, by weight percent, 5–20 to 95–80, and a foaming agent adapted to foam the polyolefins during extrusion, forming an extrudate of the blend thus obtained by expressing said molten mixture through a die, foaming the extrudate during extrusion and then orienting said extrudate by subjecting the same to a substantial drawing.

11. An extrudate according to claim 10 prepared from a minor proportion of low density polyethylene and a sufficient major proportion of a colored polypropylene to prepare a blend, the polyethylene having a density of about 0.91 and the polypropylene having a density of 0.9.

* * * * *